United States Patent Office 2,861,086
Patented Nov. 18, 1958

1

2,861,086

17-OXYGENATED ESTRA-1,3,5(10)-TRIENE-1,3-DIOLS, AND THE CORRESPONDING ESTERS AND ETHERS

James Jiu, Morton Grove, Ill., assignor to G. D. Searle & Co., Chicago, Ill., a corporation of Delaware No Drawing. Application December 27, 1957
Serial No. 705,493

7 Claims. (Cl. 260—397.4)

This invention relates to 17-oxygenated estra-1,3,5(10)-triene-1,3-diols, and esters and ethers corresponding thereto. More particularly, this invention relates to products of the formula

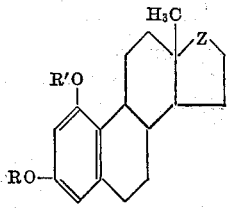

wherein Z represents a member of the group consisting of carbonyl, hydroxymethylene, (lower alkanoyl)oxymethylene, benzoyloxymethylene, (lower alkyl)hydroxymethylene, and (lower alkyl)(lower alkanoyl)oxymethylene radicals; R represents a member of the group consisting of hydrogen, and lower alkyl and lower alkanoyl radicals; and R' represents a member of the group consisting of hydrogen and lower alkanoyl radicals.

With respect to Z in the foregoing pictographic representation of products of the present invention, it will be understood by those skilled in the art that carbonyl radicals necessarily have the formula

hydroxymethylene radicals the formula

(lower alkanoyl)oxymethylene radicals the formula

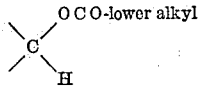

benzoyloxymethylene radicals the formula

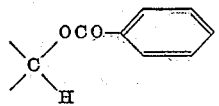

(lower alkyl)hydroxymethylene radicals the formula

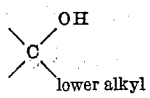

and (lower alkyl)(lower alkanoyl)oxymethylene radicals the formula

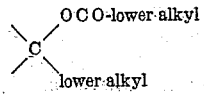

The lower alkyl radicals designated herein include methyl, ethyl, propyl, isopropyl, butyl, isobutyl, sec.-butyl, tert.-butyl, pentyl, isopentyl, tert.-pentyl, neopentyl, hexyl, isohexyl, heptyl, octyl, and like $C_nH_{2n+1}$ radicals wherein $n$ is an integer amounting to less than 9. Lower alkanoyl radicals, of course, are—as indicated above—radicals of the formula —OCO-lower alkyl The compounds of this invention are useful because of their valuable and diverse pharmacological properties. In addition to osteotrophic, lipodiatic, and mildly feminizing effects commonly associated with the natural estrogens, the subject compositions also appear to antagonize progestational activity in the animal body.

Manufacture of the claimed compositions proceeds from an appropriate starting material of the formula

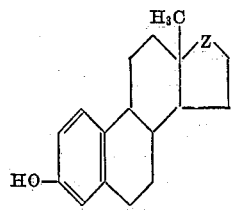

which, heated with lead tetraacetate in the presence of acetic acid, affords

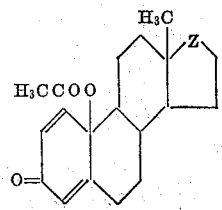

this material, in turn, being rearranged and converted to a 3-ether of the invention by contacting with hydrogen chloride in a suitable alcohol—preferably a secondary or tertiary alcohol. Alternatively, the 10-acetoxy compound aforesaid is contacted with acetic anhydride in the presence of a trace of sulfuric acid to give a 1,3-diacetate hereof. The diacetate is hydrolyzed to the corresponding phenolic product of the invention with, for example, methanolic hydrogen chloride at the boiling point; and re-esterification with an acid anhydride or acid chloride of choice in the presence of a base such as pyridine provides other esters as required.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (°C.) and relative amounts of materials in parts by weight, except as otherwise noted.

Example 1

A. *10-acetoxyestra-1,4-diene-3,17-dione.*—To a suspension of 80 parts of estrone in 2000 parts of glacial acetic acid maintained at less than 30° C. is added, portionwise over a 10-minute period with agitation, 329 parts of lead tetraacetate. Agitation in the specified temperature range is continued for an additional 20 minutes, at which point the reaction mixture is dumped into ice water. This mixture, in turn, is extracted with chloroform and the chloroform extract dried over anhydrous sodium sulfate. Evaporation of solvent under reduced pressures leaves a residue which is purified by chromatography on magnesium silicate, a 4:1 volumetric ratio of benzene to hexane being used as developing solvent. There is obtained by this means 10-acetoxy-estra-1,4-diene-3,17-dione, which, recrystallized from methanol, melts at 255–258° C.

B. *1,3 - diacetoxyestra - 1,3,5(10)-trien-17-one.*—To a suspension of 3 parts of 10 - acetoxyestra - 1,4 - diene-3,17-dione in 25 parts of acetic anhydride is added a trace of concentrated sulfuric acid. Upon agitation, the reaction mixture turns deep red in color and becomes homogeneous. Agitation is continued for a few moments longer, following which the solution obtained is allowed to stand at room temperatures for 2 hours. Water is then added and the resultant mixture extracted with chloroform. The chloroform extract is successively washed with dilute aqueous potassium bicarbonate and water, and then dried over anhydrous sodium sulfate. Evaporation of solvent under reduced pressures leaves a residue which, crystallized from methanol, melts at 183–185° C. The product thus obtained is 1,3-diacetoxyestra-1,3,5(10)-trien-17-one, the formula of which is

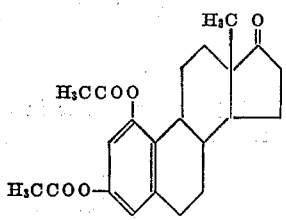

*Example 2*

*1,3 - dihydroxyestra - 1,3,5(10) - trien - 17 - one.*—A solution of 4 parts of 1,3-diacetoxyestra-1,3,5(10)-trien-17-one in a mixture of 115 parts of methanol with 17 parts of 15 percent muriatic acid is heated at the boiling point in an atmosphere of nitrogen under reflux for 2½ hours. The reactants are thereupon dumped onto cracked ice, and the resultant mixture extracted with chloroform. The chloroform extract is washed with water and then dried over anhydrous sodium sulfate. Distillation of solvent at reduced pressures leaves a residue which, crystallized from benzene, melts at 248–251° C. The material thus obtained is 1,3-dihydroxyestra-1,3,5(10)-trien-17-one, of the formula

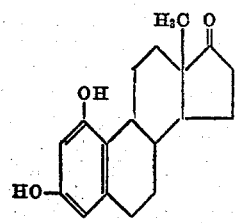

*Example 3*

*1 - hydroxy - 3 - isopropoxyestra - 1,3,5(10) - trien-17-one.*—A solution of 2 parts of 10-acetoxyestra-1,4-diene-3,17-dione in 80 parts of 2-propanol containing 25 parts of hydrogen chloride is agitated at room temperatures for 4 hours. The solution is then dumped into 500 parts of water and the resulting precipitate extracted with ether. The ether extract is washed with water and then dried over anhydrous sodium sulfate. Evaporation of solvent under reduced pressures leaves a residue which crystallizes on trituration with ethyl acetate. Recrystallization from ethyl acetate affords pure 1-hydroxy-3-isopropoxyestra-1,3,5(10)-trien-17-one, which melts in the range 195–203° C. The product has the formula

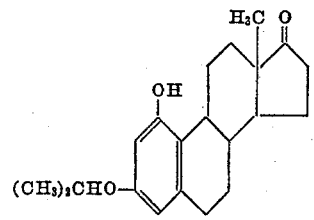

*Example 4*

*1,3 - dioctanoyloxyestra - 1,3,5(10) - trien - 17 - one.*—Approximately 3 parts of 1,3-dihydroxyestra-1,3,5(10)-trien-17-one is dissolved in 300 parts of pyridine. There is then introduced 85 parts of octanoyl chloride, whereupon the reactants are allowed to stand at room temperatures for 24 hours. They are then dumped onto cracked ice, and the resulting mixture is extracted with benzene. The benzene extract is carefully washed, first with aqueous muriatic acid and then with water, following which it is dried over anhydrous sodium sulfate. Evaporation of solvent under reduced pressures leaves as a residue the desired 1,3-dioctanoyloxyestra-1,3,5(10)-trien-17-one, the formula of which is

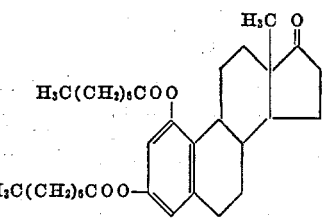

*Example 5*

*1,3 - dibenzoyloxyestra - 1,3,5(10) - trien - 17 - one.*—To a solution of 1 part of 1,3-dihydroxyestra-1,3,5(10)-trien-17-one in 10 parts of pyridine is added 24 parts of benzoyl chloride. The slightly exothermic reaction mixture turns deep red. After standing at room temperatures for 22 hours, the mixture is poured onto cracked ice; and this mixture, in turn, is extracted with benzene. The benzene extract is washed with aqueous muriatic acid and then with water. Next it is dried over anhydrous sodium sulfate, whereupon solvent is removed by distillation under reduced pressures. Chromatography of the residue on silica gel, using benzene and ethyl acetate as developing solvents, gives 1,3-dibenzoyloxyestra-1,3,5(10)-trien-17-one, which, recrystallized from methanol, melts at 161–163° C. The product has the formula

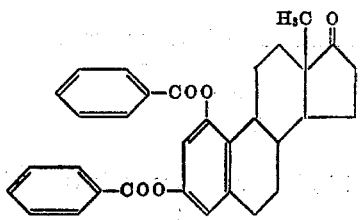

*Example 6*

A. *10-acetoxy-17β-hydroxyestra-1,4-dien-3-one.*—To a suspension of 25 parts of 17β-estradiol in 500 parts of glacial acetic acid at temperatures between 25 and 35° C. is added, with agitation over a 10-minute period, 101 parts of lead tetraacetate. Agitation is maintained for an additional 20 minutes, whereupon the reaction mixture is dumped onto cracked ice. The resultant mixture is extracted with benzene. The benzene extract, after having been washed with water, is dried over anhydrous sodium sulfate and stripped of solvent by distillation under reduced pressures. The residue is chromatographed on magnesium silicate, using benzene and ethyl acetate as developing solvents. From an eluate comprising 1 part of ethyl acetate for each 19 parts of benzene there is obtained the desired 10-acetoxy-17β-hydroxyestra-1,4-dien-3-one, which, recrystallized from ethyl acetate, melts at 203–206° C.

B. *1,3,17β-triacetoxyestra-1,3,5(10)-triene.*—To a suspension of 4 parts of 11-acetoxy-17β-hydroxyestra-1,4-dien-3-one in 25 parts of acetic anhydride is added a trace of sulfuric acid. The reactants are agitated for a few minutes, during which time solution occurs and a deep red color develops. The solution is let stand at room temperatures for 2 hours and then dumped into ice water. Sufficient saturated aqueous potassium bicarbonate is introduced to bring the resultant mixture to neutrality, whereupon it is extracted with benzene. The benzene extract is washed with water and dried over anhydrous sodium sulfate. Evaporation of solvent at reduced pressures leaves a residue which, crystallized from methanol, affords pure 1,3,17β-triacetoxyestra-1,3,5(10)-triene, the melting point of which is 149–152° C. The product has the formula

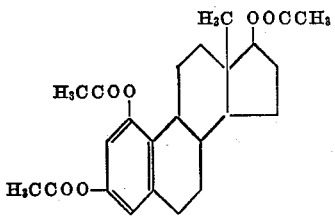

*Example 7*

*Estra-1,3,5(10)-triene-1,3,17β-triol.* — Using the technique of Example 2, but substituting 4 parts of 1,3,17β-triacetoxyestra-1,3,5(10)-triene and 25 parts of 15 percent muriatic acid for the 4 parts of 1,3-diacetoxyestra-1,3,5(10)-trien-17-one and 17 parts of 15 percent muriatic acid called for therein, one obtains estra-1,3,5(10)-triene-1,3,17β-triol, the formula of which is

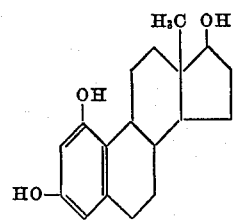

What is claimed is:
1. A compound of the formula

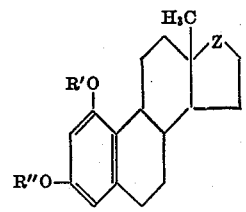

wherein Z is selected from the group consisting of carbonyl, hydroxymethylene, and (lower alkanoyl)oxymethylene radicals; R' is selected from the group consisting of hydrogen and lower alkanoyl radicals; and R" is selected from the group consisting of hydrogen and isopropyl and lower alkanoyl radicals.

2. A compound of the formula

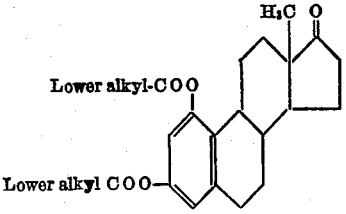

3. 1,3-diacetoxyestra-1,3,5(10)-trien-17-one.
4. 1,3-dibenzoyloxyestra-1,3,5(10)-trien-17-one.
5. 1,3-dihydroxyestra-1,3,5(10)-trien-17-one.
6. 1-hydroxy-3-isopropoxyestra-1,3,5(10)-trien-17-one.
7. 1,3,17β-triacetoxyestra-1,3,5(10)-triene.

No references cited.

UNITED STATES PATENT OFFICE
CERTIFICATE OF CORRECTION

Patent No. 2,861,086 November 18, 1958

James Jiu

It is hereby certified that error appears in the printed specification of the above numbered patent requiring correction and that the said Letters Patent should read as corrected below.

Column 5, line 11, for "11-acetoxy-" read -- 10-acetoxy- --.

Signed and sealed this 3rd day of March 1959.

SEAL)
ttest:

ARL H. AXLINE
:testing Officer

ROBERT C. WATSON
Commissioner of Patents